Sept. 13, 1932.   V. G. APPLE   1,876,539
ELECTRIC BRAKE OPERATING MECHANISM
Filed Aug. 22, 1928   4 Sheets-Sheet 1
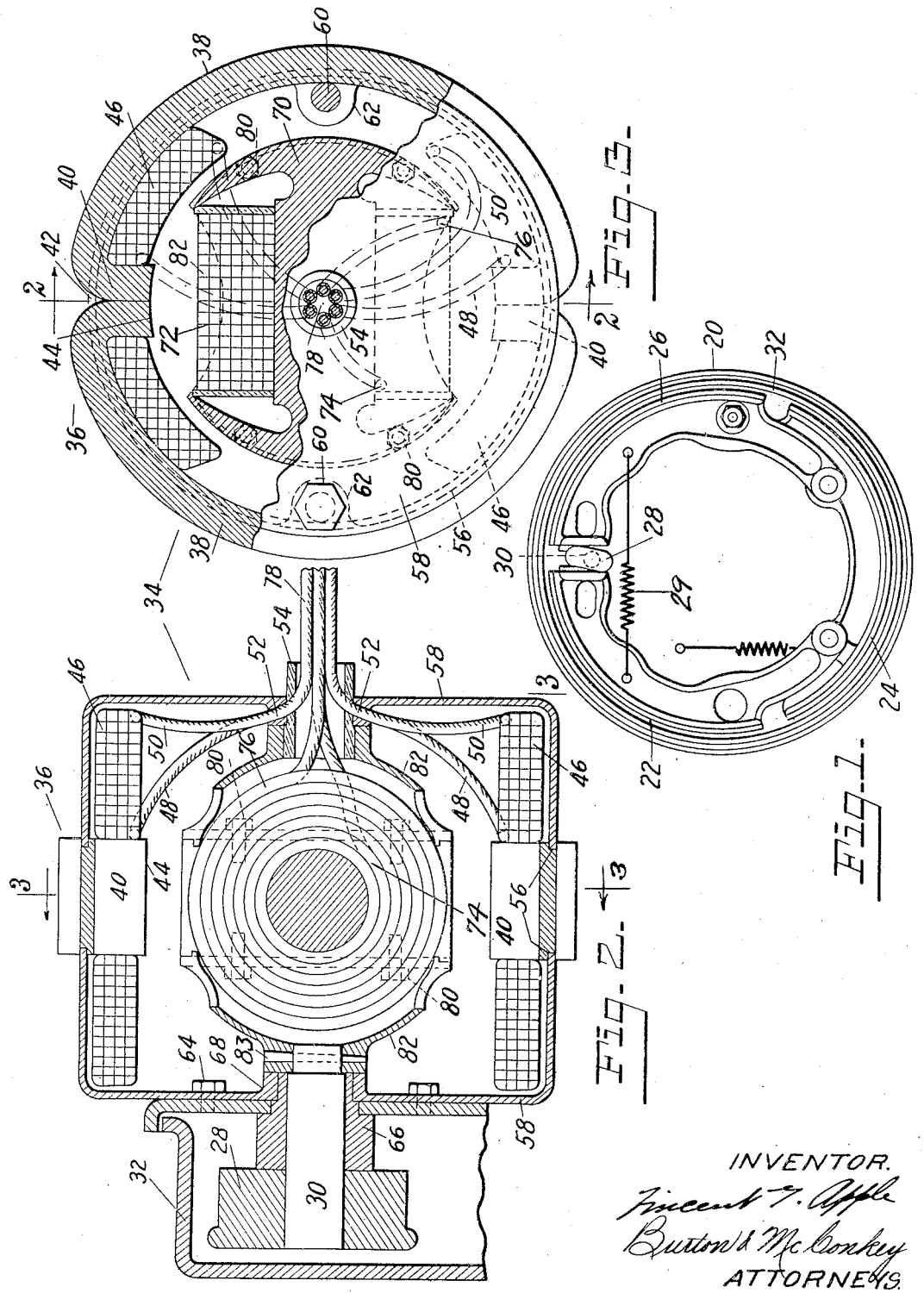
INVENTOR.
Vincent G. Apple
Burton & McConkey
ATTORNEYS.

Sept. 13, 1932.  V. G. APPLE  1,876,539
ELECTRIC BRAKE OPERATING MECHANISM
Filed Aug. 22, 1928    4 Sheets-Sheet 2
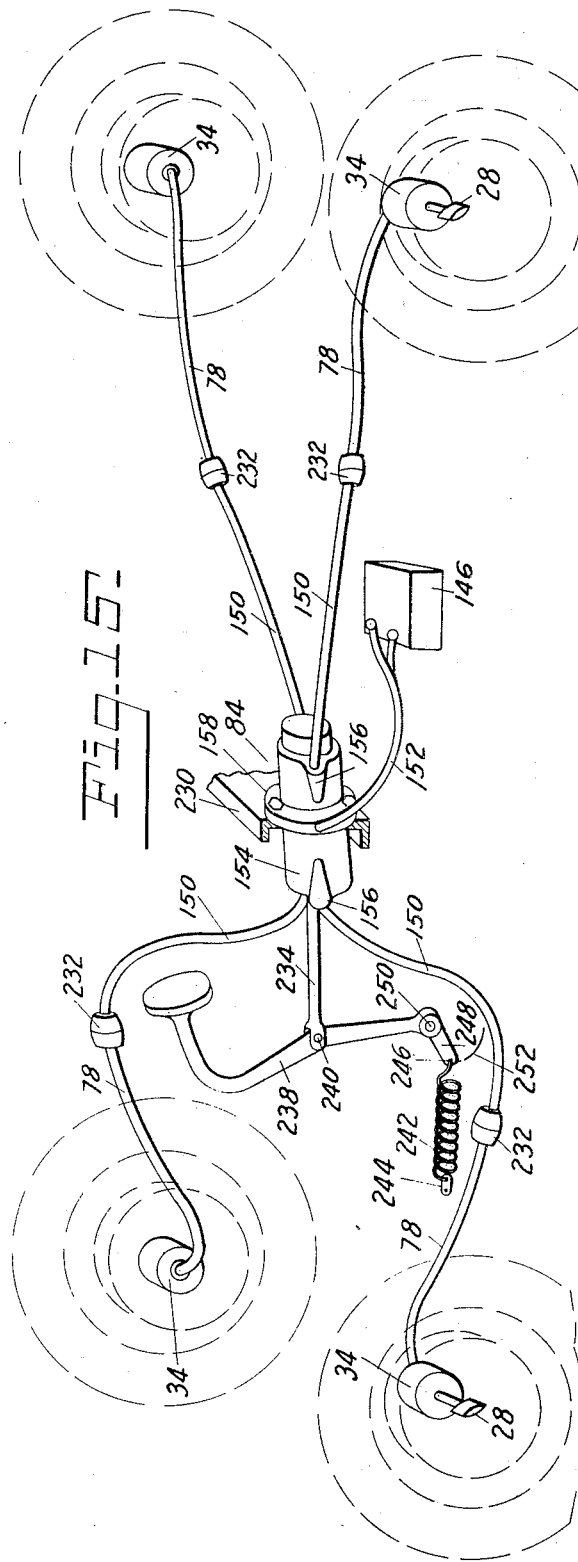
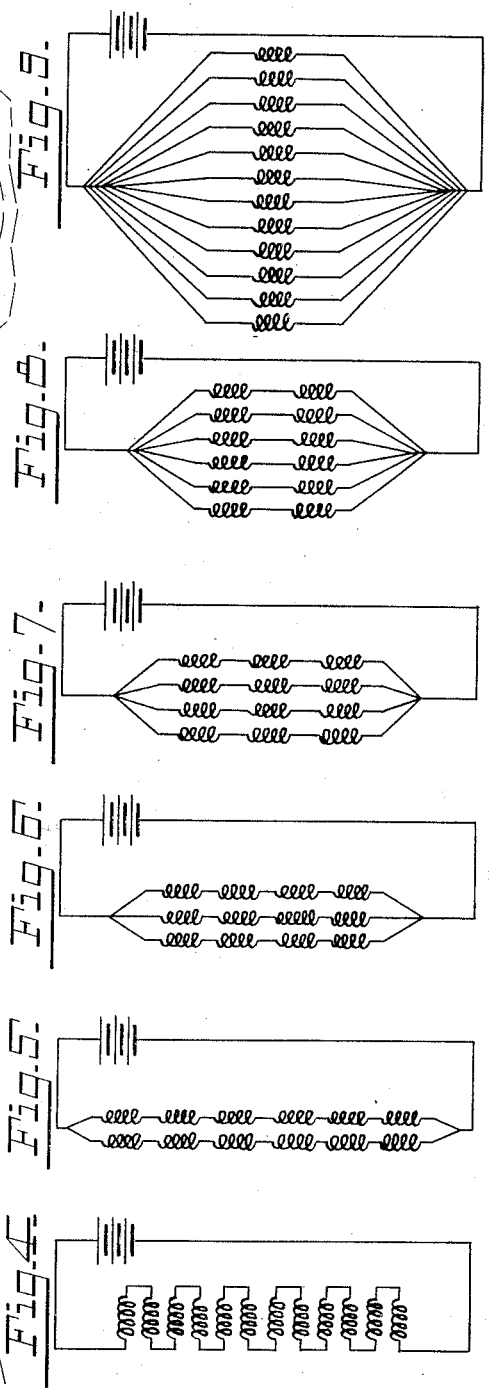
INVENTOR.
Vincent G. Apple
Burton & McConkey
ATTORNEYS

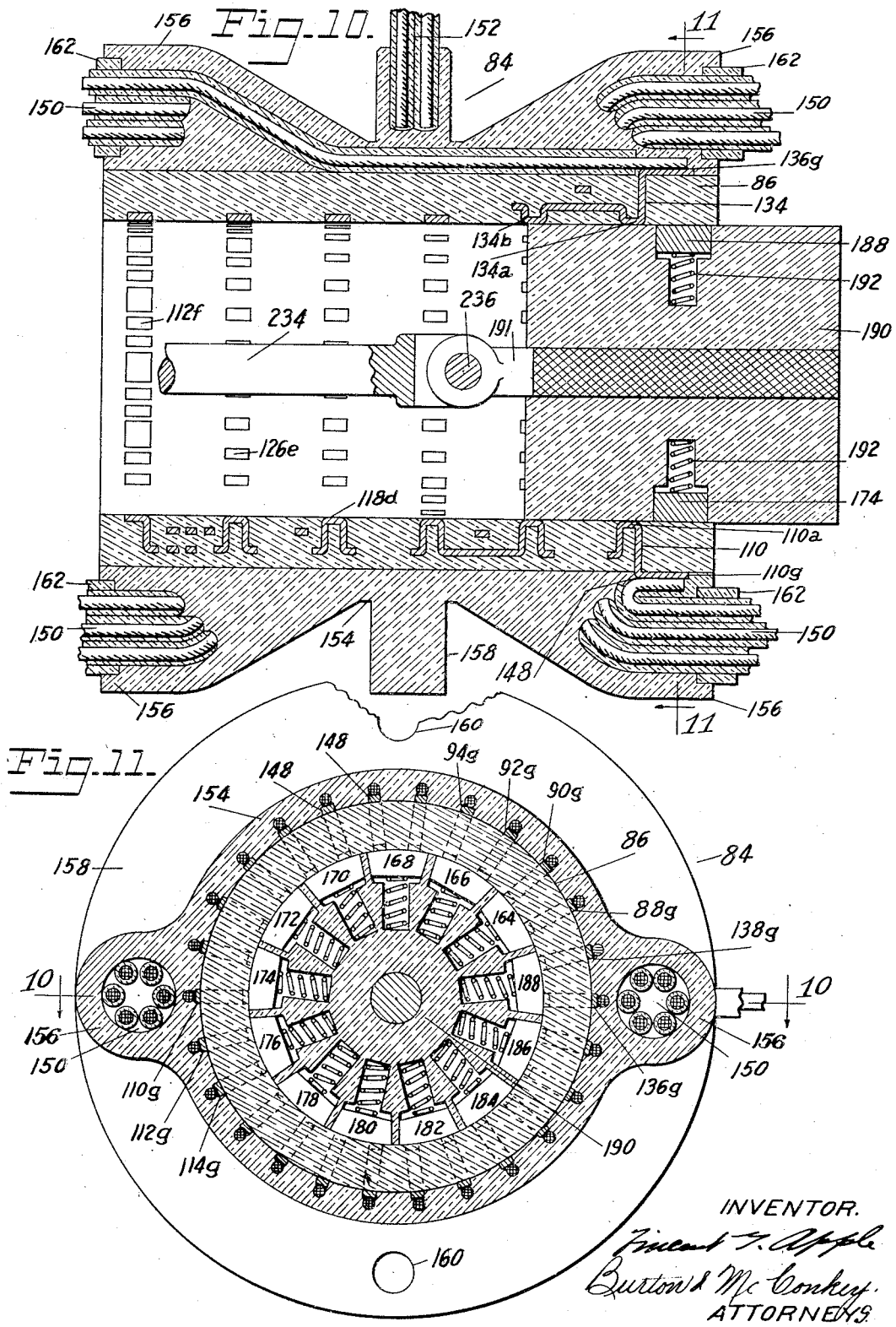

Sept. 13, 1932.  V. G. APPLE  1,876,539
ELECTRIC BRAKE OPERATING MECHANISM
Filed Aug. 22, 1928  4 Sheets-Sheet 4
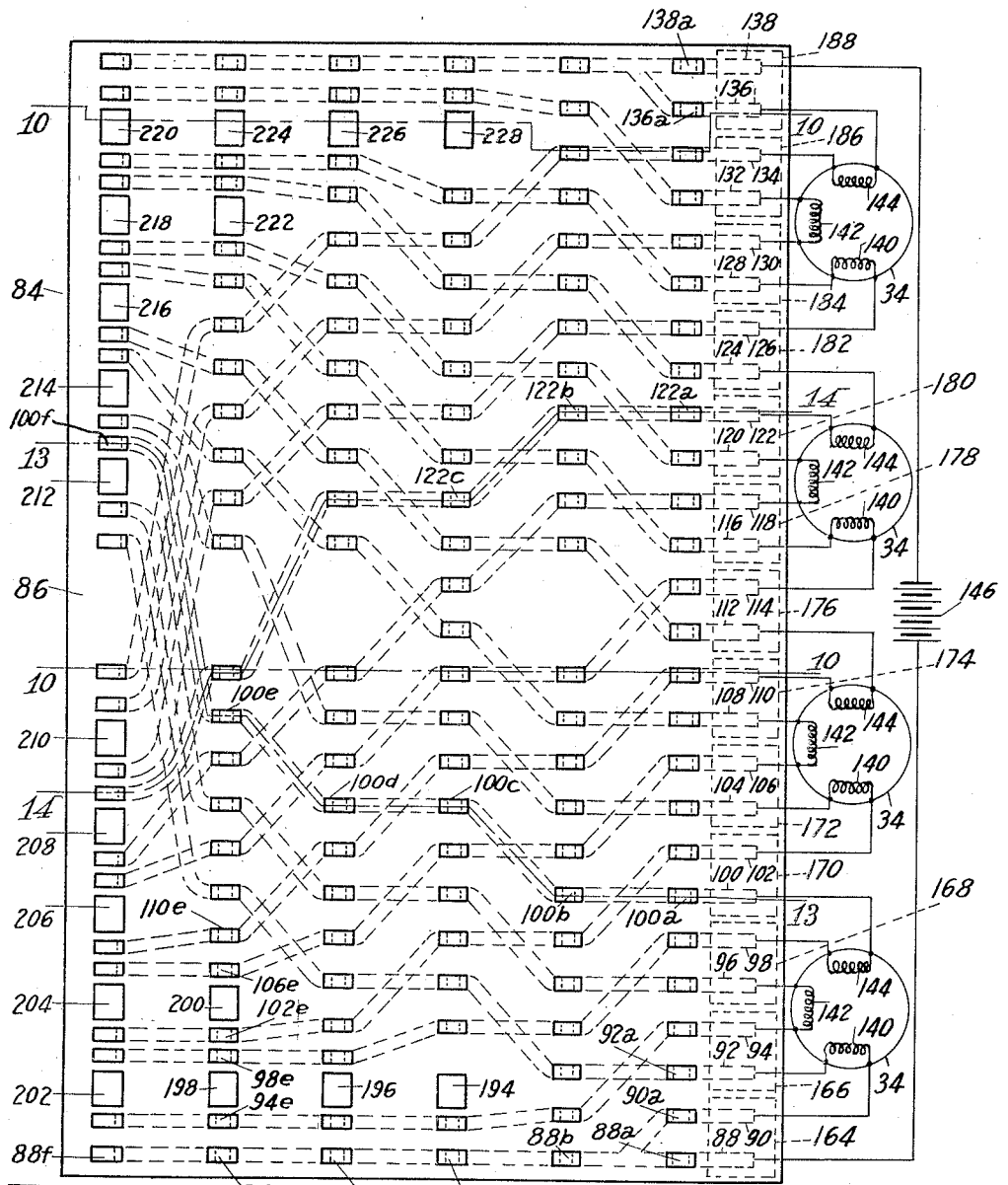
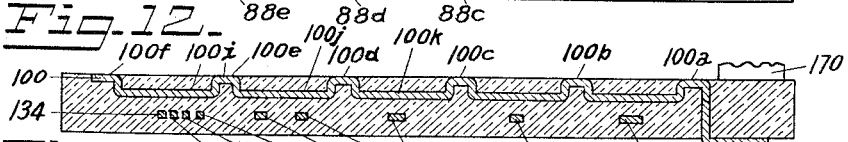
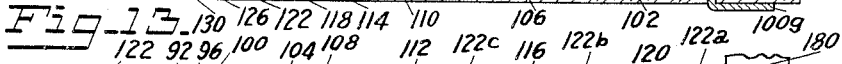

Patented Sept. 13, 1932

1,876,539

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

ELECTRIC BRAKE OPERATING MECHANISM

Application filed August 22, 1928. Serial No. 301,267.

This invention relates to brakes and particularly to power operating mechanism for motor vehicle brakes and suitable control means for use in conjunction therewith.

My improved power mechanism is of the electric type and embodies electromagnetic brake operating devices operable through an improved electric controller to vary the strength of the brake application over a wide range. The controller is manually responsive and is of a durable and inexpensive character.

Conventional variable resistance controllers waste current by converting it into heat and it is an object of this invention to eliminate this objectionable feature by providing electromagnetic brake operating devices having windings divided into a plurality of circuits and so constructing the controllers as to connect said circuits in series, in series parallel, or in parallel, as desired, through manual operation of the controller.

Since many drivers of motor vehicles are accustomed to brakes wherein the braking power is proportional to the manual effort exerted on the brake pedal or other operating member, this characteristic is preferably included in my electric braking system, and I therefore provide means whereby the manual effort required to operate the controller increases as the higher values of electromagnetic energy are brought into action thereby.

The foregoing and many other objects and meritorious features are attained by embodying the principles of the invention in the braking system hereinafter disclosed, reference being had to the drawings wherein,—

Fig. 1 is an elevation of the friction members of a well known brake.

Fig. 2 is a longitudinal cross section through one of the brake operating motors taken at 2—2 of Fig. 3.

Fig. 3 is a transverse cross section taken at 3—3 of Fig. 2.

Figs. 4 to 9 inclusive show the several ways in which the twelve divisions of the windings of the motors may be connected.

Fig. 10 is a longitudinal cross section through the controller taken at 10—10 of Fig. 11.

Fig. 11 is a transverse cross section taken at 11—11 of Fig. 10.

Fig. 12 is a schematic view of the interior diameter of the controller laid out flat for clearness.

Fig. 13 is a cross section taken at 13—13 of Fig. 12.

Fig. 14 is a cross section taken at 14—14 of Fig. 12.

Fig. 15 is a perspective view of the complete system.

My invention is embodied in brake mechanism for a motor vehicle and mounted on a backing plate 20 (Fig. 1) is a primary brake shoe 22, a secondary brake shoe 24 and an auxiliary brake shoe 26. A cam 28 on shaft 30 is adapted by partial rotation to compel contact of shoes 22, 24 and 26 with drum 32. Spring 29 withdraws the shoes from contact with the drum, thereby returning cam 28 to its normal inoperative position. These are the mechanical members of a well known brake, four of which are used in the system to which my improvements are applied.

The cam 28 is usually operated by the application of manual effort alone to shaft 30. Certain braking systems employ both manual and power effort to rotate this shaft. The improved system herein described employs electrical power means alone for this purpose, a separate motor 34 (Figs. 2 and 3) being attached to each brake.

For the motor a field ring 36 is formed by bending two bars of rectangular cross section as at 38, turning in the ends as at 40 to form poles, welding the two bars together at 42, and boring the poles at 44 to receive and clear the armature.

Two coils 46 are placed over poles 40 to create a suitable field flux, the beginning 48 and end 50 of each coil being brought through holes 52 into and through the inside of the hollow stud 54 upon which one end of the armature rotates. Field ring 36 has annular grooves 56 concentric with bore 44. Bearing heads 58 extend into grooves 56 and hold the armature concentrically supported in the field bore 44. Bolts 60 extend through one head 58 into tapped holes in bosses 62 in the other head to hold the heads together and to field ring 36. Screws 64 secure the motor 34 to backing plate 20, and a hub 66 staked in the backing plate provides a bearing for the armature and a dowel over which hub 68 of head 58 may extend.

The armature comprises an H type core 70 of magnetizable material upon which a coil 72 is wound, the beginning 74 and end 76 of the coil being taken through the inside of hollow stud 54 and brought together with the field coil ends to form a six strand cable 78. Screws 80 secure journal heads 82 to core 70, one head being free to rotate on hollow stud 54 and the other being rigidly secured to shaft 30 as by a pin 83.

It will be seen that motor 34 does not differ greatly from a bi-polar motor having an H type armature except that no commutator is required since the motor is operated through part only of a revolution by electromagnetic action and then returned to the starting point by spring 29, (see Fig. 1) or similar means not shown.

Since each motor 34 has its six coil ends so brought out as to provide three separate circuits therethrough and inasmuch as four motors are employed, a controller having twenty-four coil-end contacts and two line contacts, together with means to join these contacts in various combinations, is employed, and Figs. 4 to 9 inclusive show the several combinations which may be made by connecting the contacts in different ways.

Fig. 4 shows a circuit resulting from so connecting the coil end and line contacts that all of the coils are in series, Fig. 5 shows a circuit of six series two parallel, Fig. 6 shows four series three parallel, Fig. 7 three series four parallel, Fig. 8 two series six parallel, and Fig. 9 all coils in parallel. As is well known the circuit Fig. 9 will draw one hundred forty-four times the current as the circuit Fig. 4 but will have only twelve times the ampere turns and consequently only twelve times the effective strength. But the circuit Fig. 9 would be brought into play but rarely, as in an emergency which required locking of the wheels.

The controller 84 Figs. 10, 11, 12 and 13, comprises a hollow cylinder 86 of insulating material in which a plurality of metal strips extending longitudinally of the cylinder are imbedded. These strips are buried for the greater part of their length in the insulation, but have portions at intervals in their length so formed as to come to the surface of the insulation at the inner diameter of the cylinder to form circular rows of contact points which may be brought into electrical communication one with another by suitable connecting members.

The strips 88 to 138 inclusive are spaced about a circumference and run generally lengthwise of the cylinder, but as may be more clearly seen from Fig. 12, while all of the strips start from their points of contact with the external circuit and proceed in an axial direction for some distance, the greater portion of the strips as 92, 94, 96, 98, etc., are deflected into helical paths between certain of their contact points, as for instance strip 100 (see Figs. 12 and 13) first appears at the inner surface of the cylinder at contact point 100a, next without helical deflection it reappears at 100b, then by helical deflection at 100c (see Fig. 12), then without helical deflection at 100d, then by helical deflection at 100e and last by a greater amount of helical deflection at 100f.

Strip 122 (see Figs. 12 and 14) proceeds axially and first appears at the inner surface in contact 122a, again axially, reappearing at contact 122b, next helically, reappearing at contact 122c, etc.

From Fig. 12 it will appear that with the exception of strips 88 and 138 the strips are all helically deflected at some portion of their length, and that alternate strips are deflected, one helically right handed and the next helically left handed, and that no strip which assumes a right hand helix at one portion assumes a left hand helix at another portion.

Strip 100, where helically deflected, follows a left hand helix, and strip 122, where helically deflected, follows a right hand helix, and by reference to Figs. 13 and 14 it may be seen that the buried portions 122i, 122j, 122k, etc., of strip 122 are farther from the surface than the buried portions 100i, 100j, 100k, etc., of strip 100.

The depth that parts 100i, 100j, and 100k etc., are below the surface of the insulation is typical of all strips which follow a left hand helix and the depth that parts 122i, 122j, and 122k are below the surface is typical of all strips which follow a right hand helix, so that all right hand helical strips cross under left hand helical strips with ample insulation between (see Figs. 13 and 14).

Fig. 12 shows diagrammatically that each motor 34 has three circuits 140, 142 and 144 and that each circuit has its ends connected to a pair of strips, and that the two outer strips 88 and 138 are joined to the two terminals of the battery 146.

In actual practice the connections of the strips to the motor circuits are made as in Fig. 10, and to facilitate making these connections the cylinder 86 is first molded about the strips so that the contact points 118d, 126e, 112f, etc., appear at its inner surface and the terminal ends 88g, 90g, 92g, 94g, etc., extend above the cylinder wall at the outer surface in a circular row (see Fig. 11). Twenty-six insulated strands are then joined one to each terminal end. These strands may be fastened to the strips by welding or other suitable means as at 148. The insulated strands are then arranged in four groups 150 of six strands each and one group 152 of two strands. The group 152 of two strands is for connection to the battery and the groups 150 of six strands each are for connection to the motors, each group being made up of certain of the wires as indicated in Fig. 12.

After the strands are connected and grouped as indicated the structure is placed in a mold and insulation is molded in the form of a ring 154 about the terminals and in the form of bosses 156 about the cables.

A mounting flange 158 having bolt holes 160 is provided and the battery cable 152 is brought out through this flange. A casing 162 of appropriate insulation may be placed around each cable 150 and permitted to extend slightly within the mold when bosses 156 are formed so that the casings will be held in place by the molded material from which the bosses are made.

Having provided the controller body with six circular rows of contacts at its inner diameter as described, means to so connect these contacts as to produce circuits as in Figs. 4 to 9 inclusive must be supplied, and by reference to Figs. 10, 11 and 12 it will be seen that a circular row of thirteen brushes 164 to 188 inclusive held circumferentially spaced apart and electrically separated in the core 190 of insulation and urged outwardly by springs 192 will so connect the contacts as to produce the required circuits if moved simultaneously lengthwise through the cylinder. Core 190 is molded about the knurled surface of rod 191.

To produce the series circuit Fig. 4 one motor contact 90a must be connected to the one line contact 88a, and another motor contact 136a must be connected to the other line contact 138a. The remainder of the circuit is made by connecting adjacent motor contacts one to another. The brushes as they appear in Figs. 10 to 14 inclusive are in the inoperative position where the electric current is entirely disconnected from the motors, but it is obvious that if the row of brushes is moved over the first circular row comprising contacts 88a, 90a, 92a, etc., the series circuit Fig. 4 will be completed.

As more of the coils are to be paralleled, as for example in Fig. 8 a greater number of motor contacts must be connected to the line strips 88 and 138. To accomplish this result bridges 194 to 228 are set in the insulation so that they come midway between two brushes. When the circular row of brushes is moved over the circular row containing bridges 198 and 200 and contacts 88e, 94e, 98e, etc., the three brushes 164, 166 and 168 will be joined as one brush to line contact strip 88 and the three brushes 184, 186 and 188 will be joined as another brush to line contact strip 138, whereby the ends of six motor coils are connected to one terminal of the battery and the ends of six other motor coils are connected to the other terminal of the battery, the remaining brushes 170 to 182 connecting the other ends of the twelve said coils one to another.

From Fig. 12 it may be readily seen that when the brushes are over the circular row of contacts beginning with 88a the motor coils are connected together and to the battery as in Fig. 4, when they are over the circular row beginning with 88b the coils are connected together and to the battery as in Fig. 5, when over the row beginning with 88c they are connected as in Fig. 6, 88d as in Fig. 7, 88e as in Fig. 8, and 88f as in Fig. 9.

The complete braking system is shown in Fig. 15 where a motor 34 is attached to each brake and the controller 84 is mounted on cross member 230. Since each motor 34 has a cable 78 of six strands, insulated one from another, and the controller has corresponding cables 150, to which the motor cables must be connected a strand of one to a strand of the other, six point connectors 232 are provided for that purpose.

As a means of operating the controller a rod 234 is hinged to rod 191 of core 190 at 236 and to pedal 238 at 240 so that forward movement of pedal 238 draws core 190 lengthwise through the controller with the result hereinbefore described.

Spring 242 returns the pedal and the controller to its inoperative position where the brakes are entirely released and the manner in which this spring is connected to the pedal forms a feature of this invention.

The driver of a motor vehicle naturally expects that the more force he puts on his brake pedal the harder the brakes will be applied. This is true of mechanically operated brakes, but the controller herein shown, in itself, requires no more effort to create the higher than the lower braking powers, and, if this inherent characteristic were not compensated for, there would be danger that a driver, particularly one accustomed to mechanical brakes, would set his brakes too suddenly. To overcome this objection a variable resistance to the movement of pedal 238 is provided for by the manner in which spring 242 is connected thereto.

Spring 242 is fastened at the end 244 to any suitable point on the chassis, and at 246 to an arm 248 extending from the pivoted point 250 of pedal 238. Arm 248 extends from the pedal at such an angle that points 244, 246 and 250 are nearly, though not quite, in a straight line when the pedal is in the inoperative position. It is obvious that spring 242 will be but slightly extended for a given pedal travel during the first portion of the pedal movement but considerably more for the same pedal travel during the latter portion, due to the fact that point 246 moves around the arc 252. By carefully proportioning the spring 242 and the arm 248 the resistance to pedal movement may be kept substantially in proportion to the braking power created thereby.

What I claim is:

1. In an automotive braking system, the combination of brakes, electric power driven means to operate said brakes, windings divided into a plurality of separate circuits for energizing said means, and a series parallel controller for said circuits.

2. An automotive braking system having, in combination, brakes, separate electric brake operating means for each brake, separate windings for each said means, and a series parallel controller for said windings.

3. The combination in an automotive braking system of brakes, separate electromagnetic brake operating means for each brake, separate windings for each said electromagnetic means, and a series parallel controller for said windings.

4. An automotive braking system comprising, in combination, brakes, a separate electromagnetic brake operating means for each brake, separate windings for each brake operating means, several separate circuits in each winding, and a single series parallel controller for all of said circuits.

5. An automotive braking system comprising, in combination, brakes, a separate electric brake operating motor for each brake, a series parallel controller for said motors, and conducting wires connecting said motors to said controller, one wire for each end of each field coil of each motor and one wire for each end of the armature winding of each motor.

6. A brake operating motor comprising, in combination, a field, a pair of casing heads enclosing said field, a hollow armature supporting stud carried by one of said heads, an armature carrying a coil supported between said heads and rotatably mounted upon said hollow stud, a stud carried by said armature extending through and having a bearing in the other casing head and provided with a brake operating cam on the opposite side of said head.

7. Vehicle brake mechanism comprising, in combination, brakes, electric power mechanism to apply the brakes and an electric circuit controller comprising, a body of molded insulation having a plurality of metal strips corresponding to the number of circuits to be controlled imbedded in the body, and means to connect said strips to bring circuits attached thereto in series, series parallel or parallel.

8. Vehicle brake mechanism comprising, in combination, brakes, electric power mechanism to apply the brakes and an electric circuit controller comprising, in combination with a plurality of electric circuits, a controller body of molded insulation containing a plurality of pairs of metal strips, each pair of strips being connected to the terminals of one of the circuits to be controlled, said strips being buried in the insulation but coming to the surface at intervals so as to form rows of contacts, and means to connect certain contacts of said rows together so that the said circuits may be connected in series, series parallel or parallel.

9. Vehicle brake mechanism comprising, in combination, brakes, electric power mechanism to apply the brakes and a plurality of electric circuits, an electric circuit controller comprising a body of insulation molded about a plurality of pairs of metal strips, each pair of strips being connected to the terminals of one of the circuits to be controlled, said strips being buried in the insulation but coming to the surface at intervals so as to form spaced apart rows of contacts, the buried portions of the strips being so deflected that a strip appearing in a certain position in one row of contacts will appear in another position in another row of contacts, and means carrying a row of contact connecting members adapted to connect adjacent contacts in one row to connect the circuits in series and movable to connect similarly located contacts in another row to connect the circuits in parallel.

10. Vehicle brake mechanism comprising, in combination, brakes, electric power mechanism to apply the brakes and an electric circuit controller comprising a hollow cylinder of insulating material, a number of circular rows of metal contacts imbedded at the inner surface of said cylinder, said contacts being connected beneath the surface of the insulation so that a contact appearing in a certain position in one row is connected to a contact appearing in a different position in another row, a member movable through said cylinder and provided with a circular row of contact connectors adapted to establish a certain connection between the contacts in one row and a different connection between the contacts in a different row.

11. In combination with a plurality of circuits, vehicle brake mechanism comprising, in combination, brakes, electric power mechanism to apply the brakes and an electric circuit controller comprising, a hollow cylinder of insulating material, pairs of metal strips corresponding to the number of circuits to be controlled buried in the insulation but appearing and reappearing at the inner surface of said cylinder a number of times throughout their length to form a number of circular rows of contacts, a strip appearing as a contact in a certain circumferential position in one row appearing as another contact in a different circumferential position in another row, a circular row of brushes each adapted to connect certain contacts in a row, unconnected metal brush connectors imbedded in the insulation between certain adjacent contacts in certain rows, and means to move the row of brushes endwise the cylinder over the rows of contacts and brush connectors to establish in one row of contacts one arrangement of circuits and in another row a different arrangement of circuits.

12. In an electric braking system for an automotive vehicle, a controller, a pedal for operating said controller, an arm extending from the pivoted point of said pedal, a spring having one end attached to a point at the outer end of said arm and the other end to a stationary point on said vehicle, said stationary point being so positioned that the three mentioned points are almost in a straight line when the controller is in its inoperative position.

13. Vehicle brake mechanism comprising, in combination, brakes, electric power mechanism coupled therewith to apply the brakes including an electric controller to vary the brake applying force, a pedal connected therewith to operate the controller to increase the brake applying force upon increase of pedal movement a longitudinally movable means of a nature inherently resisting such movement so connected with said pedal that its speed of movement increases throughout the gradual depression of the pedal whereby the movement of said pedal is increasingly resisted.

14. In combination with a vehicle brake power actuating system including a manually operable member adapted to control the power transmitted to said brakes, longitudinally movable means inherently adapted to resist such movement connected with said manually operable member, said connection being such that the speed of said longitudinal movement increases in proportion with the extent of movement of said manually operable member and throughout its permissible movement.

15. In combination with a vehicle brake power actuating system including a manually operable member adapted to control the power transmitted to said brakes, a coil spring fixedly secured at one end and at the other secured to said manually operable member, the relative movement of said manually operable member, and said spring upon manipulation of the former being such that the speed of the latter increases upon constant movement of the former throughout its permissible movement.

16. In combination with a vehicle brake mechanism, power means for actuating said mechanism, a control element operable to vary said power, a depressible pedal connected to said controller, said pedal having a fixed pivotal point and an arm extending therebeyond, and a spring fixedly secured at one end and at its other secured to the extremity of said arm, the ends of said spring and the pedal pivot being in substantial alignment when the latter is in its inoperative position.

In testimony whereof, I, VINCENT G. APPLE, sign this specification.

VINCENT G. APPLE.